(12) United States Patent
Decker

(10) Patent No.: US 11,584,893 B2
(45) Date of Patent: Feb. 21, 2023

(54) ADVANCED THERMAL CHEMICAL CONVERSION PROCESS OF MUNICIPAL SOLID WASTE

(71) Applicant: Earl R Decker, Windsor (CA)

(72) Inventor: Earl R Decker, Windsor (CA)

(73) Assignee: Bright Sand, Inc., Chattanooga, TN (US)

( * ) Notice: Subject to any disclaimer, the term of this patent is extended or adjusted under 35 U.S.C. 154(b) by 220 days.

(21) Appl. No.: 16/796,633

(22) Filed: Feb. 20, 2020

(65) Prior Publication Data

US 2020/0263100 A1 Aug. 20, 2020

Related U.S. Application Data

(60) Provisional application No. 62/807,798, filed on Feb. 20, 2019.

(51) Int. Cl.
*C10J 3/80* (2006.01)
*C10J 3/78* (2006.01)
(Continued)

(52) U.S. Cl.
CPC ............... *C10J 3/78* (2013.01); *C10B 53/07* (2013.01); *C10J 3/80* (2013.01); *C10B 15/02* (2013.01);
(Continued)

(58) Field of Classification Search
CPC ....... F23G 5/0276; C10J 2200/09; C10J 3/30; C10J 3/78; C10J 3/80
See application file for complete search history.

(56) References Cited

U.S. PATENT DOCUMENTS

| 5,771,818 A | 6/1998 | Tada et al. |
| 6,244,198 B1 * | 6/2001 | Suominen ................. C10B 7/14 |
| | | 110/227 |

(Continued)

FOREIGN PATENT DOCUMENTS

| CN | 101021334 A | 8/2007 |
| CN | 101591548 A | 12/2009 |

(Continued)

OTHER PUBLICATIONS

International Search Report for counterpart application PCT/CA2020/000017 filed Feb. 20, 2020, dated May 25, 2020 (3 pages).

(Continued)

*Primary Examiner* — Imran Akram
(74) *Attorney, Agent, or Firm* — Capitol City TechLaw, PLLC; Samuel P. Burkholder

(57) ABSTRACT

A method of processing MSW, either sorted or unsorted, which can be carried out through the use of canisters to hold the waste feedstock, and autoclaves specially designed to process the waste at suitable temperature and pressure combinations is disclosed. The final solid product is a mixture of carbon ash and non-combustible materials, such as, metals, drywall, etc., and syngas that has an enhanced BTU value, typically between about 300 to 700 BTU/ft$^3$. The remainder solid material generally amounts to approximately 5% of the original MSW volume. This material can then be sorted for metals with the balance being sent to a landfill or other recycling processes depending on its composition.

8 Claims, 6 Drawing Sheets

(51) Int. Cl.
*C10B 53/07* (2006.01)
*C10B 15/02* (2006.01)

(52) U.S. Cl.
CPC .......... *C10J 2300/0946* (2013.01); *C10J 2300/1253* (2013.01); *F23G 2900/54401* (2013.01)

(56) References Cited

U.S. PATENT DOCUMENTS

| | | |
|---|---|---|
| 6,790,317 B2 | 9/2004 | Antal, Jr. |
| 6,971,323 B2 | 12/2005 | Capote et al. |
| 7,491,861 B2 | 2/2009 | Mason |
| 7,763,219 B2 | 7/2010 | Mason |
| 8,715,582 B1 | 5/2014 | Decker et al. |
| 9,989,251 B2 | 6/2018 | Tummillo et al. |
| 2004/0024279 A1* | 2/2004 | Mason .......... F23G 5/0276 588/317 |
| 2004/0055518 A1* | 3/2004 | Nunemacher .... F23G 5/0276 110/342 |
| 2010/0193344 A1 | 8/2010 | Antal, Jr. |
| 2010/0258429 A1 | 10/2010 | Ugolin |
| 2011/0012064 A1 | 1/2011 | Al Chalabi et al. |
| 2011/0017582 A1 | 1/2011 | Lurvey |
| 2012/0298020 A1 | 11/2012 | Chalabi et al. |

FOREIGN PATENT DOCUMENTS

| | | |
|---|---|---|
| CN | 203487092 U | 3/2014 |
| CN | 204138604 U | 4/2015 |
| JP | s51141486 A | 5/1982 |
| RU | 2027735 C1 | 1/1995 |
| RU | 2346023 C1 | 2/2009 |
| RU | 2574051 C2 | 1/2016 |
| RU | 2603197 C2 | 11/2016 |
| WO | 01/57161 A1 | 8/2001 |

OTHER PUBLICATIONS

Office Action dated Apr. 6, 2022, issued in the corresponding Russian Federation Patent Application No. 2021127407 (10 pages).
Notice of Allowance dated Jul. 12, 2021, issued in related divisional U.S. Appl. No. 16/796,618 (16 pages).
Office Action dated Apr. 1, 2021, issued in divisional U.S. Appl. No. 16/796,618 (16 pages).
Search Report from National Intellectual Property Administration of the People's Republic of China dated Apr. 7, 2022, in corresponding Appln. No. 202080023972.6 (3 pages).
EPO, Supplementary European Search Report and Opinion, dated Oct. 21, 2022, issued in related European Patent Appln. No. 20759916.8, Munich, Germany, (8 pages).

* cited by examiner

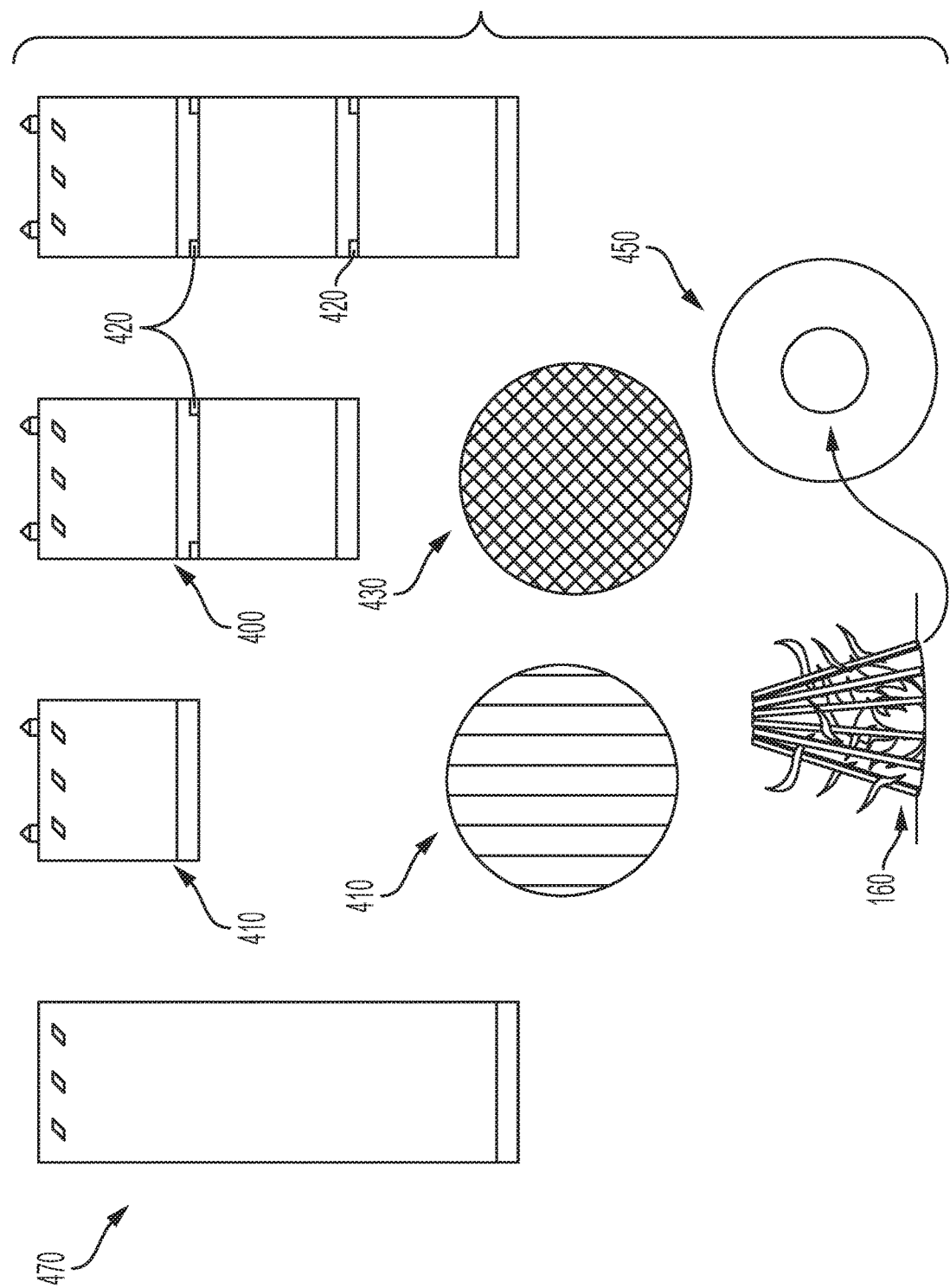

ADVANCED THERMAL CHEMICAL CONVERSION PROCESS OF MUNICIPAL SOLID WASTE

RELATED APPLICATIONS

The present application claims benefit from earlier filed U.S. Provisional Application No. 62/807,798, filed Feb. 20, 2019, which is incorporated by reference in its entirety for all purposes.

BACKGROUND

Field of Invention

The present disclosure relates to a process and equipment to process sorted and unsorted municipal solid waste (hereinafter "MSW") to produce energy, typically in the forms of electricity or heat. The system process allows for the maximum amount of energy to be retained, hydrocarbons to be driven from the MSW and syngas with an increased BTU value to be produced. This disclosure provides processes, methods and equipment to enhance the BTU value, or quality, of the syngas produced as well as significantly reduce the overall volume of waste. The waste can be reduced by up to 95% of its original volume while simultaneously reducing greenhouse gas emissions by up to 95%.

The present disclosure is directed to a process for the thermal chemical conversion of MSW to energy.

Discussion of the Related Art

There are numerous methods to convert MSW to energy, from thermal decomposition, thermal degradation, gasification, plasma arc to liquification. Each of these methods reduces MSW and produces a gas and/or latent heat to produce energy.

Thermal decomposition can process unsorted MSW and produce heat that is used to operate boilers which in turn operate turbines to produce electricity Gasification involves sorting the MSW, sizing (usually, grinding), drying and reforming the raw MSW into pellets prior to feeding into the gasification unit.

Pyrolysis involves sorting to remove unsuitable materials, then heating in the absence of oxygen resulting in the breakdown of the MSW into liquid hydrocarbons and syngas.

Unfortunately, landfilling is currently the most popular method of disposing of waste. This method involves little capital investment to simply transport the waste to a suitable location to be dumped and covered. Additionally, municipal solid waste is currently one of the largest single producers of the greenhouse gas, methane, from countless landfills. The gas is generated from decomposing waste and it seeps into the atmosphere continually.

Clearly there is a need for a process, and equipment to carry out the process, that will convert the large amounts of MSW into a green energy source while also reducing the volume of the MSW.

SUMMARY OF THE DISCLOSURE

The present disclosure is directed to a method of processing MSW, either sorted or unsorted, which can be carried out through the use of canisters to hold the waste feedstock, and autoclaves specially designed to process the waste at suitable temperature and pressure combinations. The final solid product is a mixture of carbon ash and non-combustible materials, such as, metals, drywall, etc., and syngas that has an enhanced BTU value, typically 300 to 700 BTU/ft$^3$. The remainder solid material generally amounts to approximately 5% of the original MSW volume. This material can then be sorted for metals with the balance being sent to a landfill or other recycling processes depending on its composition.

Additionally, heat generated by the process can be recovered for useful applications. The generated heat can transferred to, for instance, a hot oil system. The hot oil system can circulate oil through two heat exchangers: one at the thermal conversion chamber absorbing heat, and a second heat exchanger which can be an organic Rankine cycle, steam generator, water evaporator, or other heating system where the heat energy can be recovered, and used to generate steam to drive electricity producing turbines.

More specifically, the presently disclosed method of thermally converting a solid waste feedstock into energy involves providing a solid waste feedstock; providing at least one holding canister; providing a sealable reactor vessel having a lower gas ignition chamber and configured to operate in both updraft and downdraft conditions; placing the solid waste feedstock into the holding canister; placing at least one holding canister into the sealable reactor vessel; sealing the sealable reactor vessel; purging the reactor vessel with air; engaging an oil/gas burner to begin the thermal decomposition process; providing heated air from the burner through an attached pipe into the lower portion of the reactor vessel and through to the lowest canister section until the canister section reaches a desired first temperature ranging from 500 to 1000 C; increasing temperature of the solid waste feedstock and pressure in the reactor vessel both to desired second temperature range, 400 to 1000 C, and second pressure levels, 4 to 150 psi, respectively; adjusting the pressure of the reactor vessel to a desired third pressure level, 20 to 100 psi, by adjusting the injection of compressed air; injecting water through atomizing nozzles to produce a water gas shift reaction; continuing the thermal conversion of the solid waste feedstock until the temperature reaches a desired fourth temperature range of 100 to 1000 C; injecting water into the holding canister so that it flashes into steam and flows onto the solid waste feedstock; injecting water through larger nozzles into the reactor vessel sufficient to quench thermal conversion of the solid waste feedstock, and recovering the process gas.

The present disclosure is also directed to a process for thermal decomposition of waste material by providing waste material, at least one of a plurality of canister sections having a central opening configured to accept heated air from a heater for holding the waste material, and a carbon pillow positioned between the heated air and the waste material. The plurality of canister sections are then placed in a sealable reaction vessel, where heated air is introduced through the central opening to thereby initiate the thermal decomposition of the waste material, the reaction conditions in the reaction vessel are maintained to thermal decompose the waste material, then the waste materials are quenched with water when the thermal decomposition is complete, and syngas is produced by the thermal decomposition of the waste material.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 4 is a plan drawing of details of the canister sections according to one embodiment of the present disclosure.

DETAILED DESCRIPTION

Figure 1A:
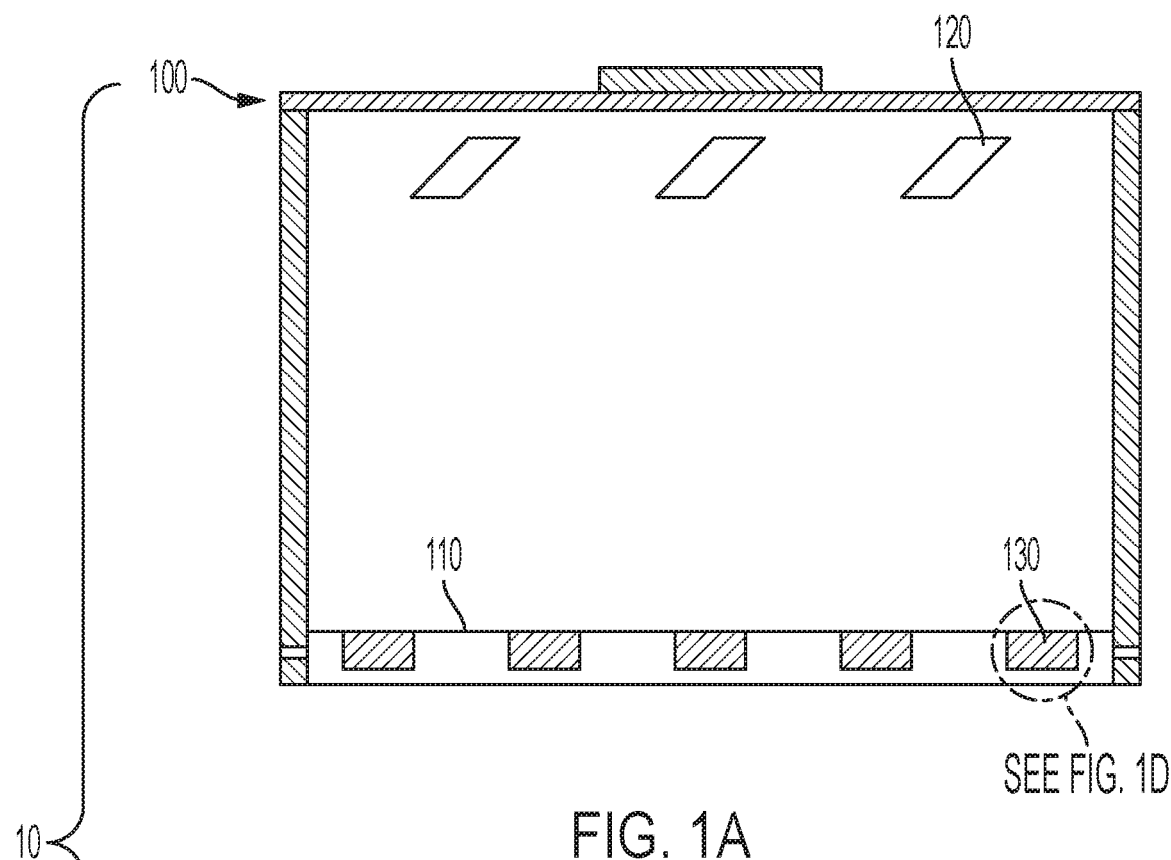
FIGS. 1A, 1B, 1C, 1D, and 1E are plan drawings of the canister sections according to one embodiment of the present disclosure.

According to several embodiments of the presently disclosed method, batch processing of MSW either sorted or unsorted, is carried out thru the use of canisters to hold the waste feedstock and specially designed autoclaves to process the waste at the desired temperature and pressure. The canisters also function as an insulator to carry the majority of the heat from the process. Syngas with an enhanced BTU value can be produced by the presently disclosed method. The final solid product is a mixture of carbon ash and non-combustible materials (metals, drywall, etc.). This solid amounts to approximately 5% of the original volume. The solid material can then be sorted for any possible recyclable components, like metals, with the remainder sent to landfill.

In the presently disclosed system, the MSW can be received in either loose or baled. In either case, the material can be placed inside cylindrical canisters which are then placed inside an autoclave to be thermally processed. One feature of the presently disclosed system is when baled MSW is processed there is no need for the bales to be opened prior to being placed into a canister section, that is, the entire compressed bale can be placed into the canister section as received from the baler. As illustrated in FIG. 4, the canister can be composed of one, two or three sections which can be stacked on top of one another to increase the amount of MSW processed in one autoclave run. The sections can be attached to one another by a connecting ring(s) 420. In some cases, the canister can be a single unitary canister 470, which can be smaller, larger or the same size as the stacked canisters. Each section of the canister can be loaded with either a bale of MSW or loose MSW, or in some cases, a mixture of the two, and then lifted into the autoclave and placed into position. The canister sections can be stacked on top of each other in the autoclave.

The various waste feedstreams leading into the baler can include a variety of possible separated recycled or refuse components including food wastes, lawn and garden waste, plastics, rubber, liquid oil, grease, lubricants, or other hydrocarbon-containing liquids or gels.

In some instances, larger size metal pieces can be introduced into the material to be baled. One reason for adding the metal pieces is to minimize dead zones inside the bale where material does not readily thermally decompose. This phenomenon is seen on an irregular basis during the presently disclosed process. While the exact mechanism of why decomposition does not occur has not been fully developed, it is currently understood that the introduction of void spaces can increase the efficiency of the decomposition process and decrease dead zones. The addition of the metal pieces can increase void spaces, also provide hot spots and increase conduction of thermal energy into more densely packed waste material.

The EPA (U.S.) broadly defines MSW as containing "everyday items such as product packaging, yard trimmings, furniture, clothing, bottles and cans, food, newspapers, appliances, electronics and batteries." Typical sources of MSW include residential, commercial, and institutional sites. Although, the EPA's definition excludes industrial, hazardous, and construction and demolition waste, for the present disclosure such wastes can be included in the definition of MSW. When handling certain classes of MSW, handling safeguards should be implemented to avoid undesirable side effects and contamination arising from the wastes.

Figure 1B:
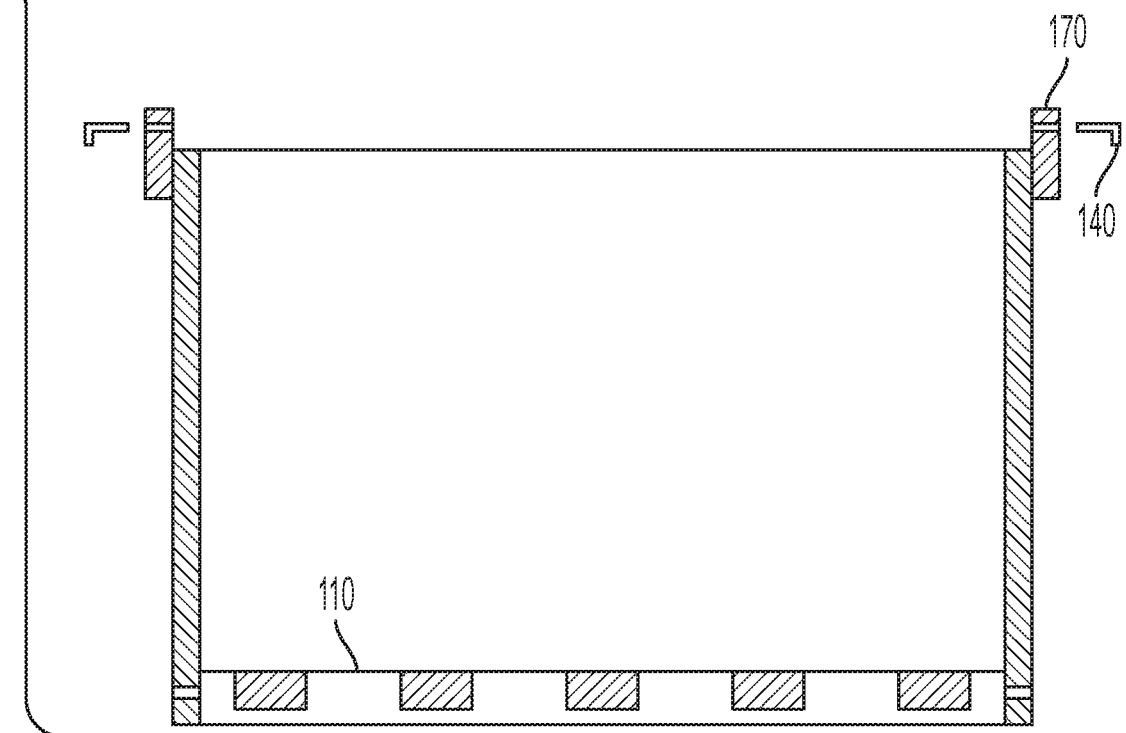
Figure 1C:
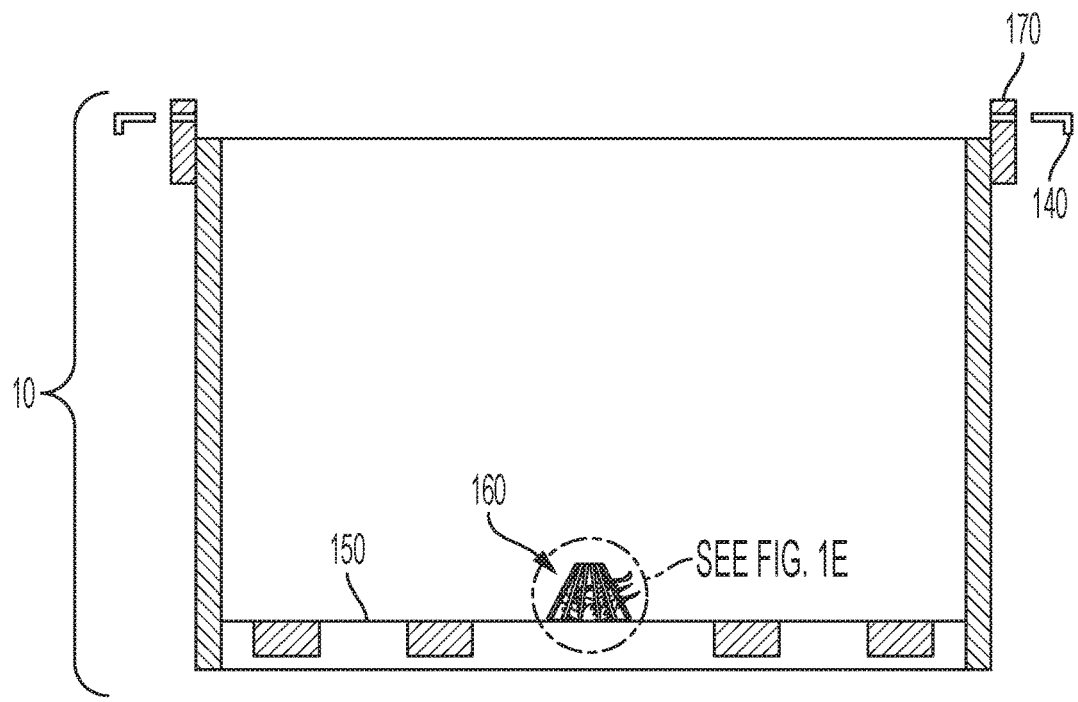
Figure 1D:
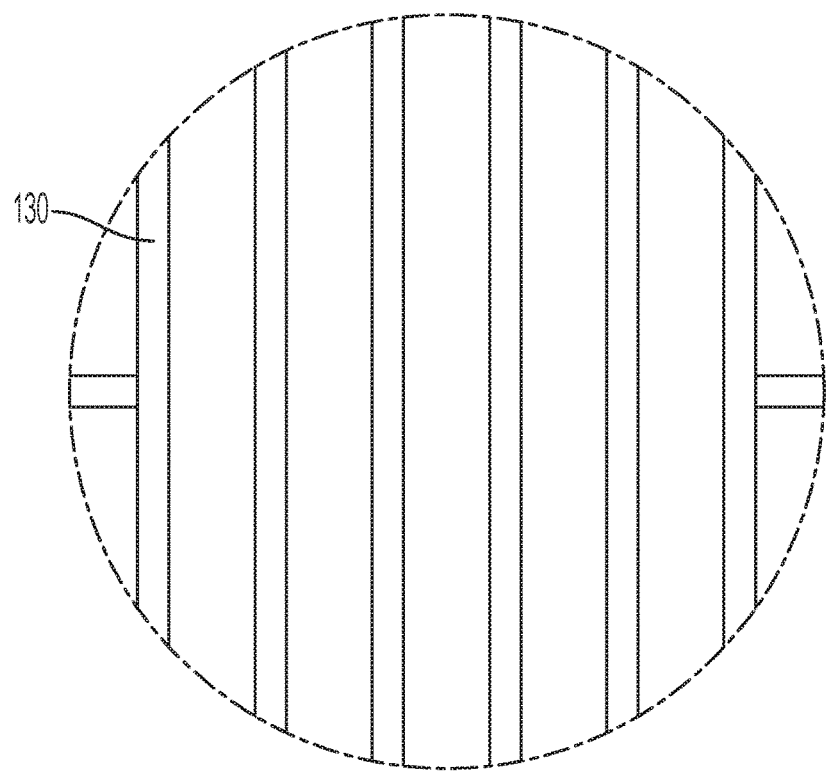

The canister sections can be separated by a connecting ring located at the top of each section. The upper section can be supported by the connecting ring 170 to prevent the sections from further compressing the MSW located in the lower section. The pins 140 pass through the hole in the connecting ring 170 and into the corresponding hole in the upper canister section. The first or lowest section in the autoclave will be located directly above the gas heater chamber. As illustrated in FIGS. 1A, 1B and 1C, three of the canister sections can be stacked on top of each other to form a large unit 10. In some embodiments of the presently taught system, the top of the gas heater chamber can be equipped with a solid metal plate or ring to enable the thermal decomposition process to be started and maintained more easily. The plate should have an appropriately sized hole in the middle thereof to allow for proper ventilation of the gas heater area. A canister section can have a grate or wire mesh assembly at its end portion. The grid properties can vary dependent on the properties of the MSW contained in the canister section. This arrangement is illustrated in more detail in FIGS. 1C, 1D and 4.

Figure 1E:
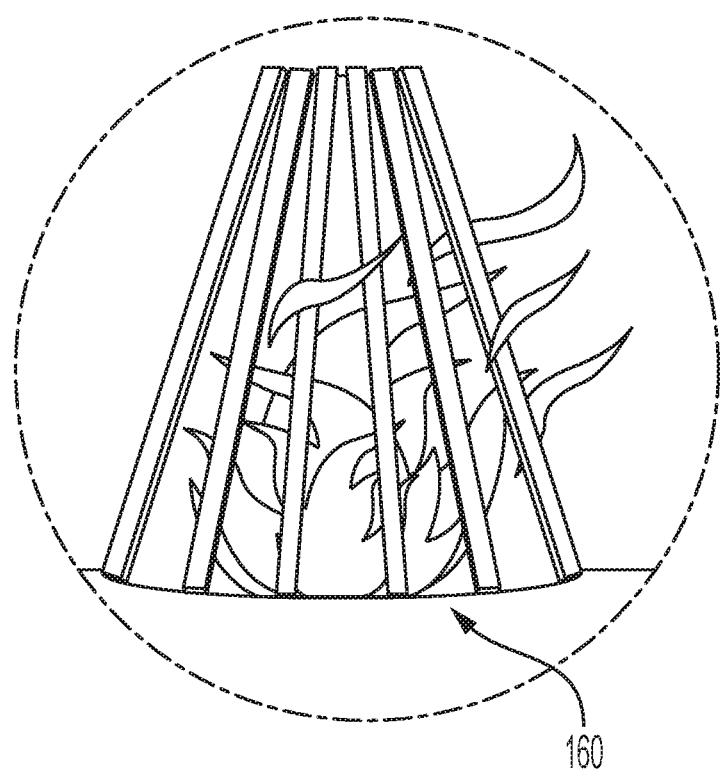

The gas heater chamber located at the bottom of the autoclave can be equipped with a conical shaped heat deflector which can be composed of an appropriate metal to withstand the conditions, for instance, stainless steel. The heat deflector 160 can be in a fluted cone shape as shown in FIGS. 1C and 1E. The lowest canister section should be located above the highest part of the heat deflector to provide enough room from the bottom of the canister to the top of the heat deflector for the thermal conversion process to generate enough heat and air flow to allow for the creation of a thermal layer in the MSW present in the canisters.

As shown in FIG. 4, the lower stage of the multi-stage canister can be equipped with a substantially closed bottom 450 with a center opening for the heated air to be introduced there through. In some embodiments of the present teachings, the bottom of the lower stage canister can be equipped with a grating or perforated floor, 410, 430, to permit air flow. Additionally, the lower stage canister can have a conical structure 160 projecting up from the circumference of the center opening. A carbon pillow can be positioned around the conical structure to enhance the initial thermal decomposition process.

The carbon pillow can be composed primarily of charcoal. The carbon pillow can be positioned around and over the conical structure 160 and over the grated floor structure 430. The carbon pillow can be thick enough that the heated air does not directly impact the solid waste material during the initial start-up operation of the thermal decomposition process. For illustrative purposes, in some instances, the carbon pillow can be ten inches or more in depth. The solid waste material is thermally converted to syngas during the presently disclosed thermal decomposition process, and does not come into direct contact with the heated air.

The upper stage of the multi-stage process canister reactor can have a perforated or grated floor or bottom structure (see 110, 130 and 150 of FIGS. 1A, 1B, 1C and 1D) that should be constructed so that the floor can support the bale of compressed MSW or other materials deposited therein to be thermally decomposed. The bottom structure can include reinforcing bars or supports across the canister. Additionally, the bottom structure should be able to support any non-processed materials that remain after the thermal decomposition process is stopped, and stop them from falling down into a lower stage canister section of the canister reactor.

The canister sections can be equipped with air vents 120 at appropriate locations to control the thermal reaction within the canister. These air vents can be set, in some instances, to a desired opening prior to the insertion of the filled canisters into the autoclave. In some embodiments of the canisters, the top 100 and the vents 120 can both independently of one another be present during the thermal decomposition process.

The canister sections are sized to accommodate a bale of compressed MSW. These bales typically weigh from between 1000 to 2600 pounds. The bales can be produced in various dimensions. Typically the bales are 3 to 5 feet high, but can be as tall as 12 feet high, the bale diameter can be about 4 to 5 feet. The presently disclosed system is not limited to a certain size or dimension of the baled MSW but can be sized, larger or smaller, to accommodate the size of the available bales. Certain properties such as conversion efficiencies or increased BTU value of the gas may be impacted by the bale size.

In some embodiments of the present teachings, the MSW can be baled without sorting of the waste, and in other embodiments the waste can be sorted on the basis of its BTU content. Thus, high density BTU waste materials, plastics and rubber-containing items, like tires, can be separated from lower density BTU waste material like newspaper, food or yard waste. The separated items can be compressed into separate bales, or in some embodiments, the separated items can be re-mixed to obtain an MSW mixture with an average baseline BTU content in each bale.

As the various waste materials are added to the bales, liquid waste materials can also be added. Liquid wastes such as used motor oils or lubricants can increase the BTU content of the baled material.

The ability to separately load each canister section of the presently disclosed system allows for one or more of the canisters to be loaded with loose MSW while other canisters can be loaded with baled MSW. This flexibility allows for larger items to be processed without the need for baling. As mentioned above, the size of the grid or grate at the lower opening of the canister section can be quite large with bulk or large items, and substantially smaller with a bale of MSW.

Figure 2:
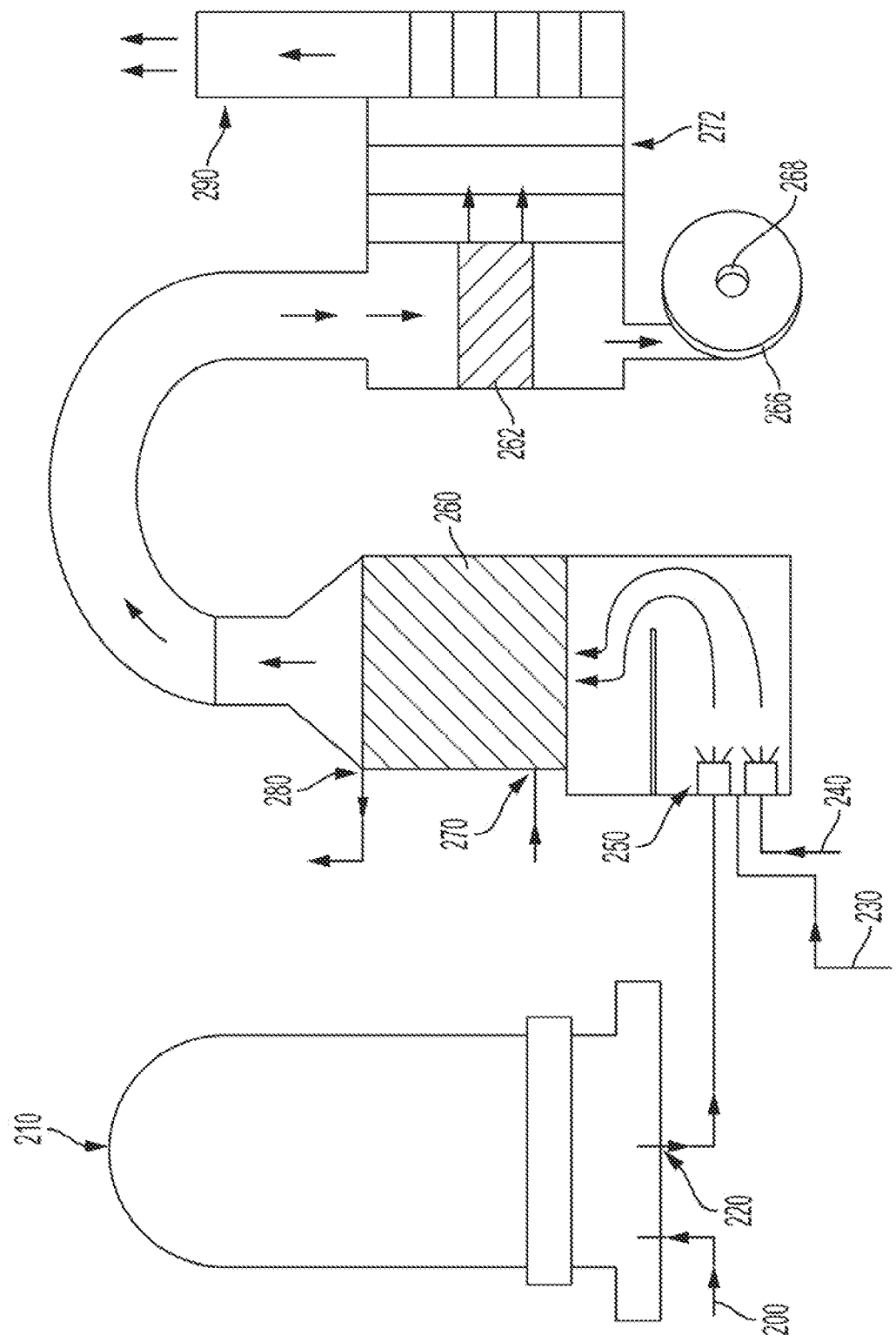
FIG. 2 is a general schematic of an autoclave and gas handling device according to one embodiment of the present disclosure.

An overview of one embodiment of the present teachings is provided in FIG. 2, with the autoclave 210 containing the canisters 10 filled with MSW at the left hand side. Air 200 for the thermal conversion of the MSW is added to the autoclave and the resulting enhanced BTU syngas 220 is produced. The syngas can then be mixed, as necessary to sustain combustion, with a secondary fuel 230 such as diesel, natural gas or propane, and air 240, and then combusted in a burner assembly 250 to produce heated gas. The heated gas can then be sent through a heat exchanger 260 to transfer its energy to an Organic Rankine Cycle ("ORC") or steam boiler to produce electricity. The heated gas can then pass through an air cleaning assembly for subsequent release to the environment.

All components of the cylindrical canisters can be assembled of stainless steel or low carbon steel depending on the structural requirements of the environment. The grates between the sections of the canisters can be composed of, for example, low carbon steel, while any wire mesh separating the sections or laying on top of a grate can be composed of stainless steel.

Temperatures and pressures during the thermal conversion process can be monitored by means of heat and pressure sensors located throughout the autoclave. The sensors can be located at the top dome, the top, middle and bottom canister sections, the inner shield and the various process lines entering and leaving the autoclave. The sensors can be installed using known methods through the walls of the autoclave to allow for measurements of reactor conditions during the thermal conversion process.

The autoclave according to the present disclosure can include means to operate in both updraft and downdraft conditions. Those means include ports or inlets/outlets for compressed air or another suitable fluid medium located at, at least, the top and bottom portions of the autoclave.

Figure 3A:
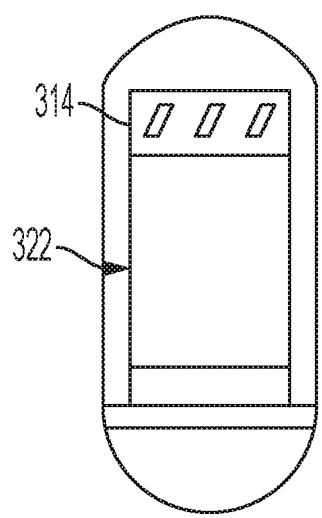
FIGS. 3A and 3B are plan drawings of the autoclave and canisters according to one embodiment of the present disclosure.
Figure 3B:
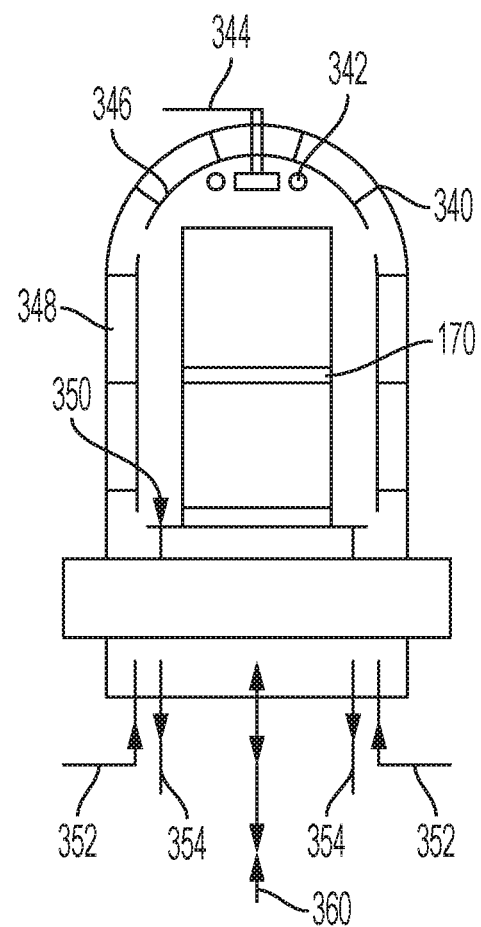

One possible embodiment of the presently disclosed autoclave or MSW processor is further illustrated in FIG. 3. As seen in FIGS. 3A and 3B, the autoclave provides for various inputs and outputs 342, 344, 352, 354, during the thermal conversion cycle with at least one compressed air inlet 200, 352, at least one atomized water inlet 342, quenching water 344, at least one counter flow control outlet 354, at least one inlet for heated air 360, and at least one outlet for the produced syngas 220, 360. In FIG. 3A, the canister section 314 with air vents sits above the shield 322 which has a reduced area, a lowered top, and the lip removed from previous versions. In FIG. 3B, the thermal shield 346 is attached to the autoclave by at least posts 340, ceramic coating 348 can be on the interior of the autoclave, and a heat reflective plate 350 is under the canister. In some embodiments of the present teachings, the inlets and outlets for the various components can be shared, that is, the component moving through a particular opening can be varied dependent on the stage of the process.

Additional features of the illustrated embodiment of the reaction vessel include changes from the reactor vessel described in U.S. Pat. No. 8,713,582 B1. Those changes include, but are not limited to, a smaller thermal shield surrounds the canister inside the autoclave so that at least portion of the top and bottom canister sections is located outside of the thermal shield, and an atomized water inlet.

One embodiment of the presently disclosed process involves placing a carbon pillow into the bottom of the lowest canister section to provide a layer between the ignition gas and the MSW. The carbon can be ignited by the heated air, and thereby turn into a thermal layer. In some embodiments of the process, the MSW is not contacted directly with the heated air from the heater but rather the carbon pillow is ignited which in turn begins the thermal conversion of the MSW. During the downdraft cycle, the thermal layer will still continue upwards thru the MSW while the process gases will pass down thru the carbon layer. It is understood that as the gases pass through the carbon layer any aromatic cyclical hydrocarbon ring compounds present can be broken down.

Unsorted MSW can be then loaded into a canister which in turn is placed into the autoclave. The waste can be placed loosely into a canister or compressed bales maybe placed into the canisters. Preferably the bales are cylindrical and sized to fit in the canisters of the present teachings. The bales can be compressed between 100 and 1000 psi.

The conversion process according to the present disclosure is a combination of updraft and downdraft gasification in a low oxygen atmosphere at pressure. The process begins in a startup cycle which involves opening the counter flow valve, then opening the ignition gas valve and an air inlet valve. This process produces a Venturi effect that draws a vacuum/negative pressure on the counter flow line.

A burner which can be supplied with one or more of natural gas, propane or diesel provides the thermal energy to start the thermal conversion of the carbon pillow. The burner is located on the process line and produces a heated air that travels into the bottom of the autoclave to ignite the carbon pillow. The gas/diesel burner is then engaged until a temperature sensor on the counter flow line reaches the desired temperature, typically between 250 to 1000 C. In some cases, the burner operates for 5 to 10 minutes, in other cases, this process can last up to 25 minutes and appears to be dependent on feedstock variations. The process produces a carbon dioxide rich atmosphere which provides the necessary elements for a reverse Boudouard Reaction.

When the ignition process is completed, the Venturi and the fuel valve feeding the burner are closed, while leaving the burner fan operating. Typically the burner fan runs for about five to ten minutes or until the counter flow temperature reaches 250-300 Celsius.

The startup cycle is complete when the burner is turned off, and the burner valve, Venturi, and the counterflow valves are all closed.

The next step in the process is the updraft process which begins with the opening, at about 5 to 20% open, of a process valve and the main compressed air valve is also opened at about 2 to 20% open. The updraft process begins to build in both pressure, to about 4 to 6 bar (60 to 100 psi), and temperature, to about 100 to 1000 C, as measured on the process thermocouple located on the process line leaving the autoclave.

Atomized water can be injected into the autoclave during the process to control the temperature at the flue gas exit thermocouple to between about 500 to 1000 C. The water is also understood to initiate a water gas shift reaction which enhances the BTU value of the syn gas produced. Water can be injected from the top of the autoclave and also from side ports to contain the thermal conversion at lower sections of the autoclave.

The updraft step continues maintaining a temperature of 100 to 700 C measured at the process line thermocouple that is located on the process line leaving the autoclave.

The process is then converted to downdraft to complete the thermal breakdown of all the material in the MSW into simple gases. Preferably, the MSW material generates mainly C1 thru C4 gases. The downdraft operation provides the added benefit of forcing the off gas thru the thermal layer which can break down any larger molecules present in the gas, such as aromatic hydrocarbon rings.

The presently disclosed process can be continued until a desired endpoint is reached. The desired endpoint may be, but is not limited to, the point at which the MSW feedstock is i) converted to ash, black carbon, char or charcoal, or ii) reduced in mass to a level equal to approximately 10% or less of the original MSW feedstock mass. The MSW feedstock can then be quenched with steam. The remaining heat from the MSW feedstock superheats the steam to drive hydrocarbons off and produce hydrogen. After cooling, the holding canister is then removed from the reactor vessel and the remaining ash, minerals, glass, gypsum, carbon and non-combustibles can be removed from the holding canister.

During the quench cycle, water is metered through larger spray nozzles on the top of the autoclave thru the inner shield or, in some case, outside of the shield. At the relatively high temperatures present in the reactor, the water is flashed into steam and thus provides an additional source of hydrogen. The hydrogen increases the BTU value of the syngas produced. During the quench portion of the disclosed process, typically the amount of water utilized for quenching is within the range of 5 to 20 gallons of water per two tons of original MSW feedstock.

The syngas produced from the thermal conversion of the MSW is then piped to a separate combustion chamber 250 located outside of the autoclave 210. The syngas is mixed with air and combusted to produce more heat energy. The combustion chamber can be equipped with a continuously lit pilot burner fueled with any one of natural gas, propane and/or diesel. The second burner 240 acts as a pilot as well as a backup heater to allow the combustion chamber to continue to develop heat. One possible embodiment of this syngas combustion system is illustrated in FIG. 2.

The heat from the combustion of the syngas is transferred thru a heat exchanger 260 to a suitable fluid medium 270, 280, such as synthetic oil or water. The fluid medium can then be circulated thru a heat engine (not shown), such as an ORC engine to produce electricity.

The final emissions can be mixed with fresh air, optionally sent through a wet scrubber 262 to reduce the temperature, then further cooled by a blower 266 with a fresh air intake 268, passed through an air filtering system 272, such as a Blue Sky Filtering system, then through a HEPA filter 290.

The presently disclosed process can reduce the greenhouse gas foot print of the MSW by 95%.

The presently disclosed process for the conversion of MSW feedstock to less than 5% of its original volume can have reversible process flows, allowing gases to flow both upward and downward. In other words, the thermal conversion of the MSW feedstock can be in both downdraft and updraft directions.

The disclosed process for thermal decomposition of waste material first involves providing waste material, and at least one of a plurality of canister sections having a central opening configured to accept heated air from a heater for holding the waste material, and a carbon pillow as described above. In some instances, a single canister section can be utilized in place of the stacked plurality of canister sections. The next step is to place the plurality of canister sections in a sealable reaction vessel, and introducing a heated air through the central opening to thereby initiate the thermal decomposition of the waste material. Once the thermal decomposition is initiated, then the reaction conditions in the reaction vessel need to be maintained to thermal decompose the waste material. When the thermal decomposition is complete, the waste materials can be quenched with water, and the syngas is produced by the thermal decomposition of the waste material can be collected.

Thermal decomposition occurs with reaction conditions comprise temperatures ranging from 400 to 850 C, and vessel pressures ranging from 4 to 200 psi. Those conditions are maintained after the heated air is extinguished, and the thermal conversion of the waste material is initiated.

With the tightly compressed bales at times, dead zones where the thermal decomposition is limited, are present. By adding metal pieces to the waste material, the dead zones are diminished in places where the metal pieces are added in an amount sufficient to reduce the amount of non-thermally decomposed waste material.

As set forth above, the waste material can be provided as a cylindrical bale of compressed waste material wrapped with a protective material to maintain the waste material in a compressed condition. In other cases, the waste material can be provided as loose waste material. It is also possible to have one canister section with a compressed bale and another canister section with loose material, or even a mix of the two forms in one canister section.

A sealable reactor vessel generally suitable for used with the presently disclosed method can include the apparatus generally described in the applicant's prior patent, U.S. Pat. No. 8,715,582 B2, the disclosure of which is incorporated by reference herein in its entirety for all purposes.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of thermally converting a solid waste feedstock into energy comprising:
   providing a solid waste feedstock;
   providing at least one holding canister;
   providing a sealable reactor vessel having a lower heated air chamber and configured to operate in both updraft and downdraft conditions;
   placing the solid waste feedstock into the holding canister;
   placing the holding canister into the sealable reactor vessel;
   sealing the sealable reactor vessel;
   purging the reactor vessel with air;
   igniting an oil/gas burner to begin thermal conversion;
   providing heated air from the oil/gas burner through an attachment into the lower chamber of the reactor vessel through a lower section of the holding canister;
   continuing addition of heated air until the gas temperature on a counter flow line of the reactor vessel reaches a desired first temperature of 250° C.;
   increasing temperature of the solid waste feedstock and pressure in the reactor vessel both to desired second temperature range, 400 to 1000° C., and second pressure levels, 4 to 150 psi, respectively;
   adjusting the pressure of the reactor vessel to a desired third pressure level, 20 to 100 psi, by adjusting injection of compressed air;
   injecting atomized water into the reactor vessel to initiate a water gas shift reaction;
   continuing the thermal conversion of the solid waste feedstock until the temperature reaches a desired fourth temperature range of 100 to 1000° C.;
   injecting water into the holding canister so that it flashes into steam and flows onto the solid waste feedstock;
   injecting water into the reactor vessel using non-atomizing nozzles sufficient to quench the thermal conversion of the solid waste feedstock, and
   recovering the process gas.

2. The method according to claim 1, wherein the purging step is conducted in an updraft direction.

3. The method according to claim 1, wherein the injection of compressed air is continued until a flue gas temperature of the reactor vessel maintains a temperature of greater than 200 C.

4. The method according to claim 1, wherein the injection of compressed air can be in an updraft or downdraft direction.

5. The method according to claim 1, wherein process gas from the thermal conversion of the solid waste feedstock can be reverse flowed through the reactor vessel.

6. The method according to claim 1, wherein compressed air can be supplied at a constant or variable rate.

7. The method according to claim 1, wherein the burner is turned off after thermal conversion of the solid waste feedstock is initiated.

8. The method according to claim 1, further comprising adding metal pieces to the solid waste feedstock,
   wherein the metal pieces are added in an amount sufficient to reduce the amount of non-thermally decomposed solid waste.

* * * * *